US009396227B2

(12) United States Patent
Graefe et al.

(10) Patent No.: US 9,396,227 B2
(45) Date of Patent: Jul. 19, 2016

(54) CONTROLLED LOCK VIOLATION FOR DATA TRANSACTIONS

(75) Inventors: Goetz Graefe, Madison, WI (US); Harumi Kuno, Cupertino, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 374 days.

(21) Appl. No.: 13/434,744

(22) Filed: Mar. 29, 2012

(65) Prior Publication Data

US 2013/0262423 A1 Oct. 3, 2013

(51) Int. Cl.
*G06F 17/30* (2006.01)

(52) U.S. Cl.
CPC .............................. *G06F 17/30362* (2013.01)

(58) Field of Classification Search
CPC .......... G06F 17/3008; G06F 17/30286; G06F 17/30575; G06F 17/30377; G06F 11/1471; G06F 9/466; G06F 17/30362; G06F 17/30; G06F 17/30171; G06F 9/524; G06F 9/467; G06F 2212/621; G06F 9/30043; G06F 9/3834
USPC ................. 707/704, 686, 685, 684, E17.007, 707/999.008, 703, 797, E17.005, 696, 715, 707/E17.002, E17.044; 714/16, 15; 718/105, 107; 719/318; 712/218, 206
See application file for complete search history.

(56) References Cited

U.S. PATENT DOCUMENTS

| 4,513,367 A | * | 4/1985 | Chan et al. ..................... 711/145 |
| 4,682,327 A | * | 7/1987 | Okumura et al. ............. 370/503 |
| 5,141,839 A | * | 8/1992 | Mitchell et al. ............ 430/276.1 |
| 5,193,188 A | * | 3/1993 | Franaszek et al. .... 707/E17.007 |
| 5,263,155 A | * | 11/1993 | Wang ........................... 707/695 |
| 5,329,626 A | * | 7/1994 | Klein et al. .................... 709/248 |
| 5,333,303 A | * | 7/1994 | Mohan ............................ 714/20 |
| 5,414,839 A | * | 5/1995 | Joshi ..................... 707/E17.007 |
| 5,551,027 A | * | 8/1996 | Choy et al. ............. 712/E9.042 |
| 5,557,792 A | * | 9/1996 | Josten et al. .......... 707/E17.007 |
| 5,596,754 A | * | 1/1997 | Lomet .......................... 710/200 |
| 5,778,388 A | * | 7/1998 | Kawamura et al. ... 707/E17.007 |
| 5,960,194 A | * | 9/1999 | Choy et al. ............. 707/E17.058 |
| 6,044,404 A | * | 3/2000 | Holdsworth et al. ......... 709/229 |
| 6,397,352 B1 | * | 5/2002 | Chandrasekaran et al. ..... 714/16 |
| 6,502,088 B1 | * | 12/2002 | Gajda et al. ........... 707/E17.005 |

(Continued)

OTHER PUBLICATIONS

Eliezer Levy, Henry F. Kprth and Abraham Silberschatz—"An Optimistic Commit Protocol for Distributed Transaction Management"—Proceedings of the 1991 ACM SIGMOD1991 International Conference on Management of Dats , vol. 20, issue 2, Jun. 1991 (pp. 88-97).*

Klaus Havelund—"Using Runtime Analysis to Guide Model Checking of Java Programs"—SPIN Model Checking and Software Verification—Lecture Notes in Computer Science vol. 1885, 2000, pp. 245-264.*

(Continued)

*Primary Examiner* — Anh Ly
(74) *Attorney, Agent, or Firm* — Hewlett Packard Enterprise Patent Department (57) ABSTRACT

A system, method, and non-transitory computer readable medium for providing controlled lock violation for data transactions are presented. The system includes a processor for executing a first data transaction and a second data transaction, the first and second data transactions operating on a plurality of data resources. A controlled lock violation module grants to the second transaction a conflicting lock to a data resource locked by the first transaction with a lock, the conflicting lock granted to the second transaction while the first transaction holds its lock. The controlled lock violation module can be applied to distributed transactions in a two-phase commit and to canned transactions.

16 Claims, 9 Drawing Sheets

(56) References Cited

U.S. PATENT DOCUMENTS

| | | | |
|---|---|---|---|
| 6,722,155 B2* | 4/2004 | Fisk et al. | 62/503 |
| 6,772,154 B1* | 8/2004 | Daynes et al. | 707/E17.007 |
| 6,772,155 B1* | 8/2004 | Stegelmann | 707/E17.007 |
| 7,234,076 B2* | 6/2007 | Daynes et al. | 714/15 |
| 7,269,588 B1* | 9/2007 | Verma et al. | 707/E17.007 |
| 7,289,992 B2* | 10/2007 | Walker | 707/E17.007 |
| 7,577,658 B2* | 8/2009 | Graefe | 707/E17.007 |
| 8,327,375 B2* | 12/2012 | Somogyi | 718/104 |
| 8,364,648 B1* | 1/2013 | Sim-Tang | 707/674 |
| 2003/0050930 A1* | 3/2003 | Mosher et al. | 707/9 |
| 2003/0061537 A1* | 3/2003 | Cha et al. | 714/16 |
| 2003/0208500 A1* | 11/2003 | Daynes et al. | 707/100 |
| 2004/0064439 A1* | 4/2004 | Hinshaw et al. | 707/1 |
| 2004/0210590 A1* | 10/2004 | Somogyi | 707/100 |
| 2004/0236746 A1* | 11/2004 | Lomet | 707/9 |
| 2004/0244004 A1* | 12/2004 | Pardon et al. | 718/100 |
| 2006/0010227 A1* | 1/2006 | Atluri | 709/217 |
| 2006/0101081 A1* | 5/2006 | Lin et al. | 707/200 |
| 2006/0167960 A1* | 7/2006 | Lomet | 707/206 |
| 2007/0016754 A1* | 1/2007 | Testardi | 711/206 |
| 2007/0288708 A1* | 12/2007 | Saha et al. | 711/159 |
| 2008/0086470 A1* | 4/2008 | Graefe | 707/8 |
| 2008/0162881 A1* | 7/2008 | Welc et al. | 712/206 |
| 2008/0256073 A1* | 10/2008 | Detlefs et al. | 707/8 |
| 2008/0256074 A1* | 10/2008 | Lev et al. | 707/8 |
| 2008/0294648 A1* | 11/2008 | Lin et al. | 707/10 |
| 2008/0319997 A1* | 12/2008 | Duffy et al. | 707/8 |
| 2009/0217274 A1* | 8/2009 | Corbin et al. | 718/101 |
| 2009/0271408 A1* | 10/2009 | Graefe | 707/8 |
| 2010/0114817 A1* | 5/2010 | Broeder et al. | 707/612 |
| 2010/0138842 A1* | 6/2010 | Balko et al. | 718/107 |
| 2010/0191884 A1* | 7/2010 | Holenstein et al. | 710/200 |
| 2011/0138135 A1* | 6/2011 | Dice et al. | 711/152 |
| 2011/0153566 A1* | 6/2011 | Larson et al. | 707/638 |
| 2011/0153797 A1* | 6/2011 | Danilov et al. | 709/223 |
| 2011/0302143 A1* | 12/2011 | Lomet | 707/704 |
| 2011/0320776 A1* | 12/2011 | Welc et al. | 712/218 |
| 2012/0059963 A1* | 3/2012 | Pasupuleti et al. | 710/200 |
| 2012/0084273 A1* | 4/2012 | Lee et al. | 707/703 |
| 2012/0166407 A1* | 6/2012 | Lee et al. | 707/703 |
| 2012/0311300 A1* | 12/2012 | Sundrani et al. | 712/30 |

OTHER PUBLICATIONS

Peter M. Schwarz and Alfred Z. Spector—Carnegie-Mellon Univ., Pittsburgh, PA—"Synchronizing shared abstract types"—Published in: Journal ACM Transactions on Computer Systems (TOCS) TOCS Homepage archive—vol. 2 Issue 3,—Aug. 1984 pp. 223-250.*

Anon et al.: "A measure of transaction processing power", Datamation, Apr. 1, 1985; http://research.microsoft.com/~gray/papers/AMeasureOfTransactionProcessingPower.doc.

Carey, et al; "The performance of concurrency control algorithms for database management systems"; VLDB 1984: 107-118.

DeWitt, et al: "Implementation Techniques for Main Memory Database Systems"; ACM SIGMOD 1984: 1-8.

Gawlick, et al: "Varieties of Concurrency Control in IMS/VS Fast Pat"; IEEE Database Eng. Bull. 8(2): 3-10 (1985).

Graefe, et al.: "Modern B-tree Techniques"; Foundations and Trends in Databases (FTDB) 3(4):203-402 (2011).

Graefe: "A Survey of B-tree Locking Techniques"; ACM TODS 35(3) (2010).

Gray, et al: "Granularity of Locks and Degrees of Consistency in a Shared Data Base"; IFIP Working Conf. on Modeling in Data Base Management Systems 1976: 365-394.

Gray, et al: "Granularity of Locks in a Large Shared Data Base"; VLDB 1975: 428-451.

Johnson, et al: "Shore-MT: A Scalable Storage Manager for the Multicore Era"; EDBT 2009: 24-35.

Johnson, et al; "Aether: A Scalable Approach to Logging"; PVLDB 3(1): 681-692 (2010).

Korth: Locking Primitives in a Database System; JACM 30(1): 55-79 (1983).

Kraska, et al: "MDCC: Multi-Data Center Consistency"; Submitted for publication, available at <http://mdcc.cs.berkeley.edu.>; retrieved on Jul. 25, 2012.

Nightingale, et al: "Rethink the Sync"; ACM TOCS 26(3): (2008).

Thomson, et al: "Fast Distributed Transactions for Partitioned Database Systems"; ACM SIGMOD 2012: 1-12.

Traiger, et al: "Transactions and Consistency in Distributed Database Systems"; ACM TODS 7(3): 323-342 (1982).

* cited by examiner

|     | IS | IX | S  | X | SIX |
| --- | -- | -- | -- | - | --- |
| IS  | ok | ok | ok |   | ok  |
| IX  | ok | ok |    |   |     |
| S   | ok |    | ok |   |     |
| X   |    |    |    |   |     |
| SIX | ok |    |    |   |     |

FIG. 4A

|    | NS | NX | SN | S  | SX | XN | XS | X |
| -- | -- | -- | -- | -- | -- | -- | -- | - |
| NS | ok |    | ok | ok |    | ok | ok |   |
| NX |    |    | ok |    |    | ok |    |   |
| SN | ok | ok | ok | ok | ok |    |    |   |
| S  | ok |    | ok | ok |    |    |    |   |
| SX |    |    | ok |    |    |    |    |   |
| XN | ok | ok |    |    |    |    |    |   |
| XS | ok |    |    |    |    |    |    |   |
| X  |    |    |    |    |    |    |    |   |

CONTROLLED LOCK VIOLATION FOR DATA TRANSACTIONS

BACKGROUND

The ability to access, store, and manage data has become a critical facet of today's economy. Likely not a minute (or second) goes by in which data is not manipulated electronically by an individual or organization. Virtually every electronic system available—from bank accounts to medical records and air traffic control—is dependent on data. As the volume of data handled increases, so does the need to provide data systems such as databases, key-value stores, file systems, data management systems, and data stores that manage data reliably and efficiently.

One way to provide data reliability is to process data in data transactions. A data transaction is a logical unit of operations performed on data that is treated in a coherent and reliable way independent of other transactions. The operations must be atomic, consistent, isolated and durable. A system of locks is typically used to provide these capabilities. A lock is a synchronization mechanism for governing access to a resource when there are multiple concurrent threads of execution. Users may only be permitted to modify data in transactions that hold a lock that gives users exclusive access to the locked data until the lock is released. There are many types of locks to choose from, including shared locks.

Traditionally, locks for a given transaction are released only after the transaction is committed, that is, only after all changes made to the transaction data are made permanent. A transaction is not considered committed until a commit log record is generated and written to stable storage. Writing the commit log record for a given transaction may be more time consuming than executing the transaction itself if the transaction does not incur a buffer fault. For example, if the underlying database system has enough memory that a given transaction does not incur a buffer fault, then flushing the commit record to stable storage typically takes at least an order of magnitude more time than transaction execution. If a transaction that performs 20,000 to 100,000 instructions acquires locks, e.g., key value locks in a B-tree index, right at the start of the transaction and holds them until the transaction is committed, the transaction may retain the locks for about 0.01 ms while it is executing and for about another 0.1 ms (or even 10 ms) during commit processing, i.e., after the transaction logic is complete. In systems with large memory and large buffer pools, short transactions may therefore complete in much less time than it takes to log their commit record on stable storage. The time it takes to log a commit record depends upon the type of stable storage used (e.g., disk, flash memory, memristor, etc.)

Given this inefficiency, an Early Lock Release ("ELR") approach has been developed to allow a transaction to release its locks as soon as a commit record is allocated in a log buffer. That is, transaction locks may be released before the commit record is flushed into stable storage and before the transaction becomes durable. This ELR approach enables a dramatic reduction of lock contention and provides considerable performance improvements. However, it can also produce wrong results, e.g., incorrect data updates, if it fails to register and respect commit dependencies among participating transactions, and does not fully optimize distributed transactions (e.g., if multiple replicas are maintained). Improving transaction efficiency without the drawbacks of ELR therefore remains one of the key challenges in data processing today.

BRIEF DESCRIPTION OF THE DRAWINGS

The present application may be more fully appreciated in connection with the following detailed description taken in conjunction with the accompanying drawings, in which like reference characters refer to like parts throughout, and in which.

DETAILED DESCRIPTION

A method, system, and non-transitory computer readable medium for providing controlled lock violation for data transactions are disclosed. As generally described herein, a data transaction refers to a logical unit of atomic, consistent, isolated, and durable operations performed on data. The data may be stored, for example, in databases, key-value stores, file systems, data management systems, data stores, and any other system or component for storing data. A lock, as also generally described herein, is a synchronization mechanism for governing access to a resource when there are multiple concurrent threads of execution.

In various embodiments, a controlled lock violation module enables a transaction to acquire a conflicting lock retained by another transaction as soon as the lock retaining transaction has decided to commit and a commit log record has been allocated in a log buffer in a recovery log. As generally described herein, a log buffer is a temporary buffer in memory that holds information (e.g., log records) about changes made to data resources. The recovery log is a log stored in stable storage that keeps a record of all changes made to the data resources, including commit log records. In one embodiment, records stored in the recovery log are identified by a unique ID referred to as a Log Sequence Number ("LSN").

The lock retaining transaction retains its lock(s) until its commit log record is stored in stable storage, but a conflicting lock may be issued to another transaction before the commit log record is stored. The transaction acquiring the conflicting lock may be issued a commit dependency on the transaction retaining the original lock. The commit dependency is issued when the lock is an update lock for updating a data resource, for example, an exclusive lock, an intent exclusive lock, an increment lock, an intent increment lock, and so on, that is, anything other than a read-only lock. As soon as the commit log record has been written to stable storage for the transaction retaining the lock, the commit dependency may be resolved. The controlled lock violation module may be used for any type of transaction, including distributed and canned transactions, among others.

It is appreciated that embodiments described herein below may include various components and features. Some of the components and features may be removed and/or modified without departing from a scope of the method, system, and non-transitory computer readable medium for providing controlled lock violation for data transactions. It is also appreciated that, in the following description, numerous specific details are set forth to provide a thorough understanding of the embodiments. However, it is appreciated that the embodiments may be practiced without limitation to these specific details. In other instances, well known methods and structures may not be described in detail to avoid unnecessarily obscuring the description of the embodiments. Also, the embodiments may be used in combination with each other.

Reference in the specification to "an embodiment," "an example" or similar language means that a particular feature, structure, or characteristic described in connection with the embodiment or example is included in at least that one example, but not necessarily in other examples. The various instances of the phrase "in one embodiment" or similar phrases in various places in the specification are not necessarily all referring to the same embodiment. As used herein, a component is a combination of hardware and software executing on that hardware to provide a given functionality.

Figure 1:
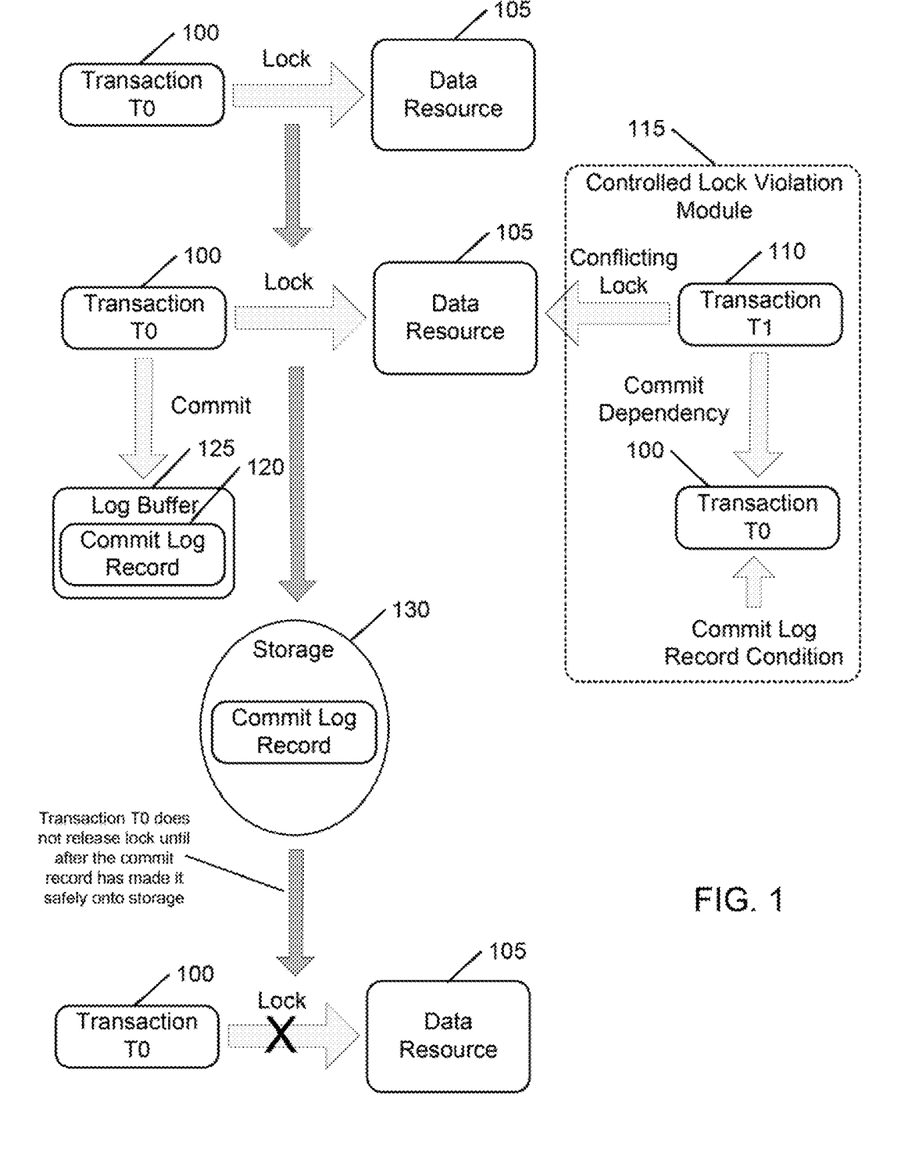
FIG. 1 is a schematic diagram illustrating an example environment in which the various embodiments may be implemented.

Referring now to FIG. 1, a schematic diagram illustrating an example environment in which the various embodiments may be implemented is described. Consider a first transaction—transaction T0 100—that holds a lock on a data resource 105. Now consider a second transaction—transaction T1 110—that desires to acquire a violating, conflicting lock to the same data resource 105. In a traditional data system, transaction T1 110 might wait for transaction T0 100 to commit (and the implied lock release) or transaction T1 110 might abort transaction T0 100 (and thus force immediate lock release). For the latter, the priorities of transaction T0 100 and transaction T1 110 are compared. The data system also checks the state of transaction T0 100. If transaction T0 100 is part of a distributed transaction in a pre-commit state, or if transaction T0 100 is already aborting and rolling back, or if transaction T0 100 has already added a commit record to its log buffer, then transaction T0 100 is protected and transaction T1 110 cannot force transaction T0 100 to abort. Importantly, before transaction T1 110 decides on a course of action, it must acquire information about transaction T0 100 and its state.

Traditional data systems therefore do not enable transaction T1 110 to acquire a conflicting lock before transaction T0 100 has become durable or is aborted. Either way, there may be a substantial latency and performance degradation in waiting for transaction T0 100 to commit or be rolled back after an abort. As described herein below, controlled lock violation is implemented to overcome the latency and performance degradation of traditional data systems. Controlled lock violation aims to achieve the performance advantages of early lock release (corrected with tags) but without releasing locks until all commit activities are complete. That is, a transaction may acquire a conflicting or violating lock but in a controlled and conditioned manner.

In various embodiments, a Controlled Lock Violation module 115 enables transaction T1 110 to acquire a conflicting lock to data resource 105 as soon as transaction T0 100 has a commit log record 120 in the log buffer 125 (but not yet on stable storage). That is, the condition for a transaction (e.g., transaction T1 110) to acquire a conflicting lock is that the transaction retaining the lock (e.g., transaction T0 100) decides to commit by adding a commit log record (e.g., commit log record 120) to the log buffer (e.g., log buffer 125). Transaction T0 100 retains all of its locks until its commit log record 120 is on stable storage 130. It is appreciated that transaction T1 110 may acquire its desired conflicting lock but it must take a commit dependency on transaction T0 100 if the lock is an update lock, for example, an exclusive lock, an intent exclusive lock, an increment lock, an intent increment lock, or anything other than a read-only lock.

It is appreciated that transaction T0 100 becomes durable when it completes writing the commit log record 120 to stable storage 130 and releases its locks. When it does so, the commit dependency between transaction T1 110 and transaction T0 100 is resolved. The commit dependency can thus be interpreted as a high water mark in the recovery log. When the recovery log has been written to stable storage 130 up to and including this high water mark, transaction T1 110 is free to commit. In other words, when transaction T1 110 acquires a lock that conflicts with a lock held by transaction T0 100, because transaction T0 100 has already allocated its commit log record 120 in the log buffer 125, then the LSN of transaction T0 100 commit log record 120 is registered as the high water mark governing transaction T1 110. Transaction T1 110 cannot commit until the recovery log has been written to stable storage 130 up to and including the LSN of transaction T0 110 commit log record 120. If transaction T1 110 is an update transaction, then it will eventually append its own commit log record to the log buffer 125 and the log on stable storage 130. In this case, the sequencing of commit records in the recovery log ensures correct enforcement of the commit dependency. In other words, the commit dependency is enforced as a matter of course.

If, on the other hand, transaction T1 110 is a read-only transaction without any log records and thus without a commit record, and if transaction T1 110 has incurred a commit dependency by violating a lock of a committing transaction T0 100, then transaction T1 110 must wait until the commit record of transaction T0 100 is saved on stable storage. This is precisely what the high water mark enforces. In other words, the Controlled Lock Violation module 115 delays a committing read-only transaction only if indeed a lock violation has taken place and only as much as absolutely necessary.

If transaction execution is faster than writing a commit record to stable storage 130, perhaps even orders of magnitude faster, then transactions may form long chains of commit dependencies. For example, consider a 0.01 ms execution time and a 10 ms commit time, when a chain of 1,000 transactions seems possible. If only one of those transactions were to abort, all subsequent ones must abort, too. In other words, this seems to be a bad case of "abort amplification" or "cascading abort." One must recognize, however, that in a traditional data system none of the subsequent transactions would have been able to acquire conflicting locks; thus, aborted transactions would never even have started or made progress past the conflicting lock request. More importantly, all transactions whose locks may be violated have reached their commit point; thus, practically the only cause for a transaction failure is a system failure, in which all subsequent transactions would fail even without the chain of commit dependencies.

Figure 2:
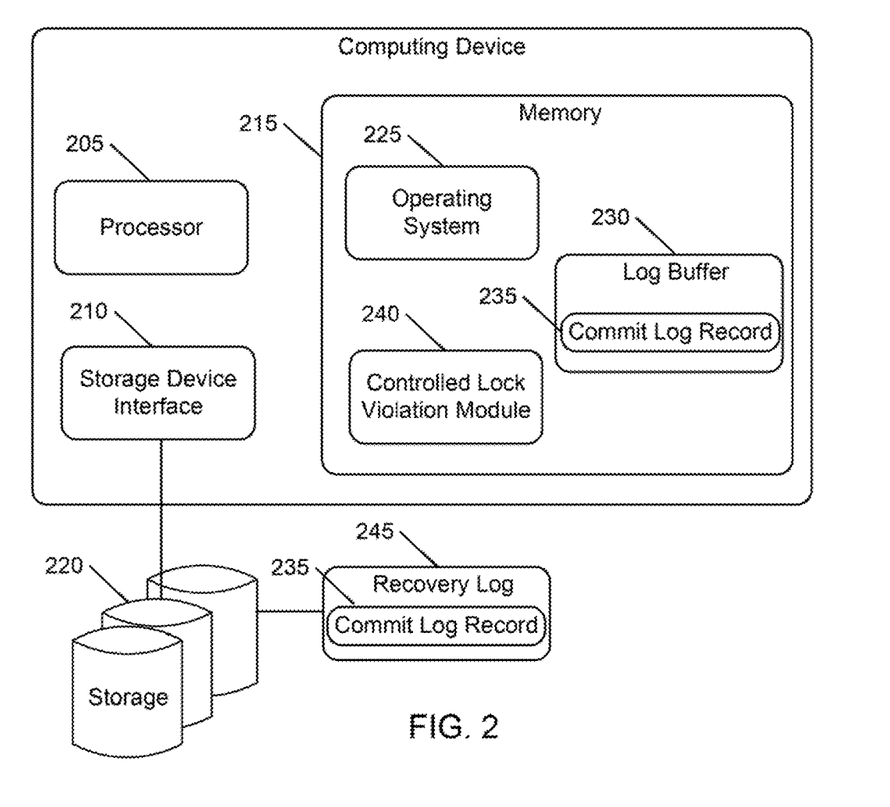
FIG. 2 is a schematic diagram of a system in which the Controlled Lock Violation module of FIG. 1 may be hosted according to various embodiments.

Attention is now directed to FIG. 2, which shows a system in which the Controlled Lock Violation module 115 of FIG. 1 may be hosted according to various embodiments. Computing device 200 includes a processor 205, a storage device interface 210, and memory 215. Processor 205 may be any combination of hardware and software that executes or interprets instructions, data transactions, codes, or signals. For example, processor 205 can be a microprocessor, an Application-Specific Integrated Circuit ("ASIC"), a distributed processor such as a cluster or network of processors or computing device, or a virtual machine.

Storage device interface 210 is a module in communication with processor 205 via which computing device 200 communicates (e.g., exchange symbols or signals representing data or information) with storage devices (e.g., one or more storage devices) 220. Storage devices 220 store a number of data resources that may be organized in databases, key-value stores, data stores, and so on. Storage device interface 210 can include hardware (e.g., pins, connectors, or integrated circuits) and software (e.g., drivers or communications stacks). For example, storage device interface 210 can be a Parallel AT Attachment ("PATA") interface, a Serial AT Attachment ("SATA") interface, a Small Computer Systems Interface ("SCSI") interface, a network (e.g., Ethernet, Fiber Channel, InfiniBand, Internet Small Computer Systems Interface ("iSCSI"), Storage Area Network ("SAN"), or Network File System ("NFS")) interface, a Universal Serial Bus ("USB") interface, or another storage device interface. Storage device interface 210 can also include other forms of memory, including non-volatile random-access-memory (NVRAM), battery-backed random-access memory (RAM), phase change memory, etc.

Memory 215 is a processor-readable medium that stores instructions, codes, data, or other information. For example, memory 215 can be a volatile random access memory ("RAM"), a persistent or non-transitory data store such as a hard disk drive or a solid-state drive, or a combination thereof or other memories. Furthermore, memory 215 can be integrated with processor 205, separate from processor 205, or external to computing device 200.

As illustrated in FIG. 2, memory 215 includes operating system 225, log buffer 230, and Controlled Lock Violation module 240. Operating system 225 and Controlled Lock Violation module 240 are each instructions or code that when executed at processor 205, cause processor 205 to perform operations that implement, respectively, operating system 225 and Controlled Lock Violation module 240. Said differently, operating system 225 and Controlled Lock Violation module 240 are hosted at computing device 200.

More specifically, Controlled Lock Violation module 240 includes code or instructions that implement the features discussed above with reference to FIG. 1. Additionally, Controlled Lock Violation module 240 includes code or instructions that implement processes discussed with reference to FIGS. 3 and 5-8.

In some implementations, Controlled Lock Violation module 240 can be hosted or implemented at a computing device appliance (or appliance). That is, the Controlled Lock Violation module 240 can be implemented at a computing device that is dedicated to hosting the Controlled Lock Violation module 240. For example, the Controlled Lock Violation module 240 can be hosted at a computing device with a minimal or "just-enough" operating system to support the data store page recovery system. Furthermore, the Controlled Lock Violation module 240 can be the only, exclusive, or primary software application hosted at the appliance.

In some implementations, log buffer 230 temporarily stores information (e.g., logs) about changes made to data resources stored in storage 220. As a specific example, log buffer 230 temporarily stores a commit log record 235 for a given data transaction before the commit log record is written to a recovery log 245 in storage 220. In some implementations, log buffer 230 is not included in memory 215 and records may be written directly to recovery log 245.

Figure 3:
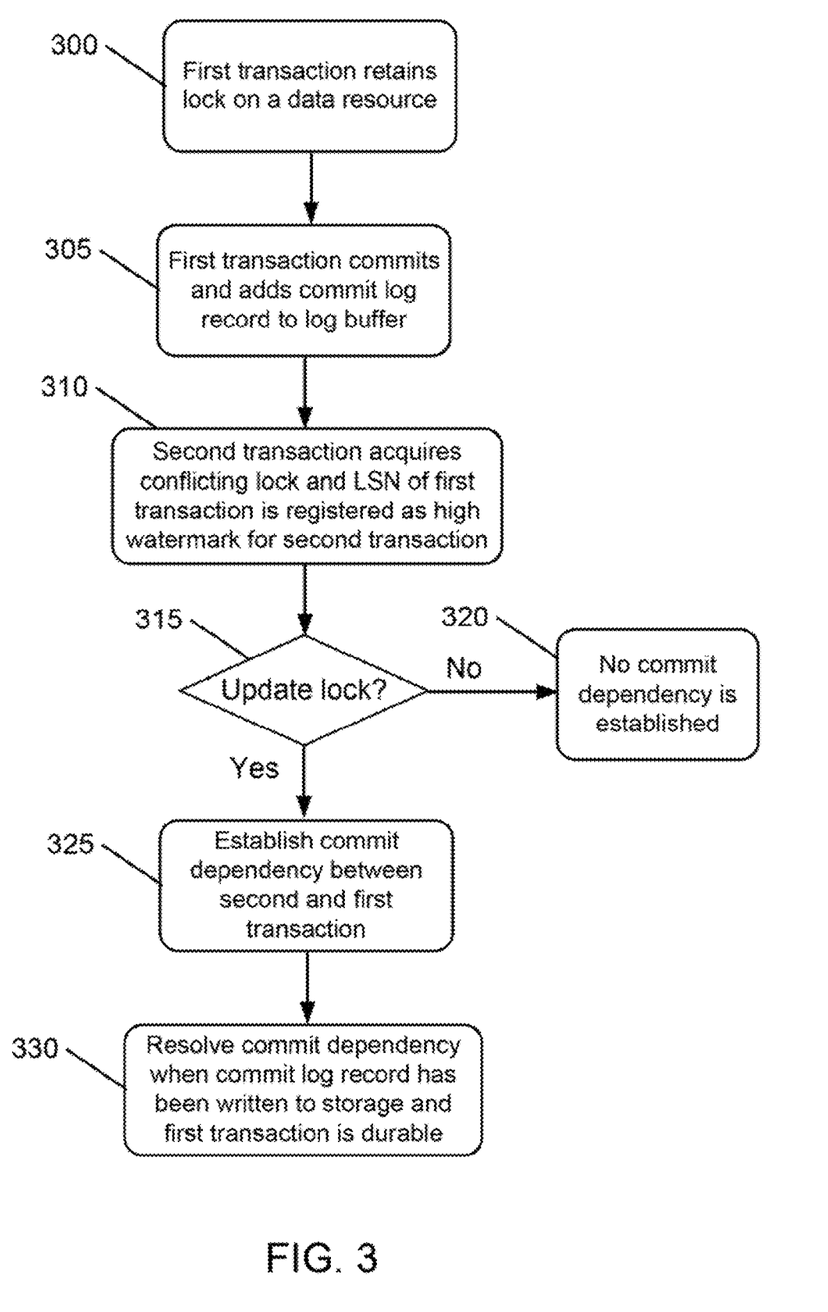
FIG. 3 is an example flowchart for providing controlled lock violation for data transactions with a Controlled Lock Violation module of FIG. 1.

Referring now to FIG. 3, an example flowchart for providing controlled lock violation for data transactions with a Controlled Lock Violation module of FIG. 1 is described. A first transaction retains a lock on a data resource (300). The first transaction commits by adding a commit log record to the log buffer (305). When the record has been added, a second transaction may acquire a conflicting lock to the same data resource locked by the first transaction (210). As described above, the LSN of the first transaction commit log record is registered as the high water mark governing the second transaction.

If the lock held by the first transaction is an update lock (315), i.e., if the lock is anything other than a read-only lock for updating the data resource, then a commit dependency is established between the second and first transaction (325). No commit dependency is established otherwise, i.e., if the lock is a ready-only lock (320). The commit dependency is resolved when the commit log record has been written to stable storage and the first transaction becomes durable (330).

Figure 4A:
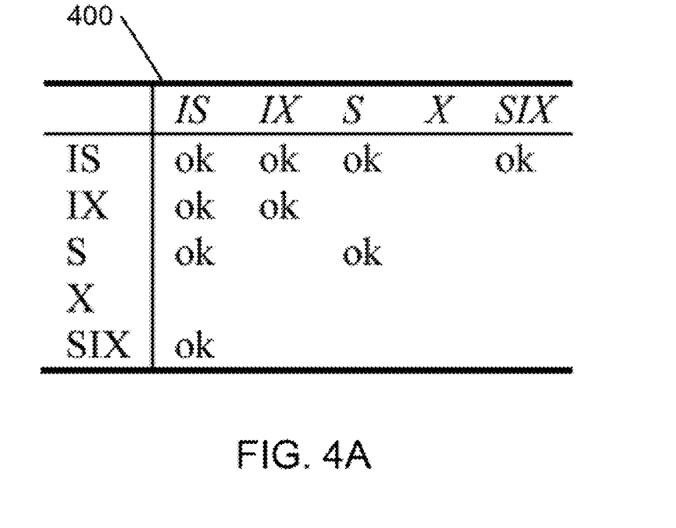
FIG. 4A illustrates an example table of compatibilities for hierarchical locks.

It is appreciated that in the case of combined locks, a conflict does not always induce a commit dependency because a combined lock may combine read-only and update parts. Attention is now directed to FIG. 4A, which illustrates an example table of compatibilities for hierarchical locks. Consider, for example, a transaction T0 holding a combination lock, e.g., an SIX lock on a file (to read the entire file and update selected pages). A commit dependency is required only if a lock acquired by a later transaction conflicts with the update part of the lock. For example, if a transaction T1 requests an IS lock (in preparation of locking individual pages in S mode), there is no conflict at all because lock modes SIX and IS are compatible as shown in Table 400. There is no conflict over this lock for the entire file; there may be conflicts if transaction T0 and transaction T1 lock the same page. Further, if transaction T2 acquires an IX lock on the file (prior to acquiring X locks on individual pages), which conflicts only with the S part of the SIX lock of transaction T0, no commit dependency is required. On the other hand, if another transaction (e.g., transaction T3) acquires an S lock on the file, which conflicts with the IX part of the SIX lock of transaction T0, then transaction T3 incurs a commit dependency on T0. In this particular case, transaction T3 also incurs a commit dependency on T2 due to the conflict between IX and S locks.

Figure 4B:
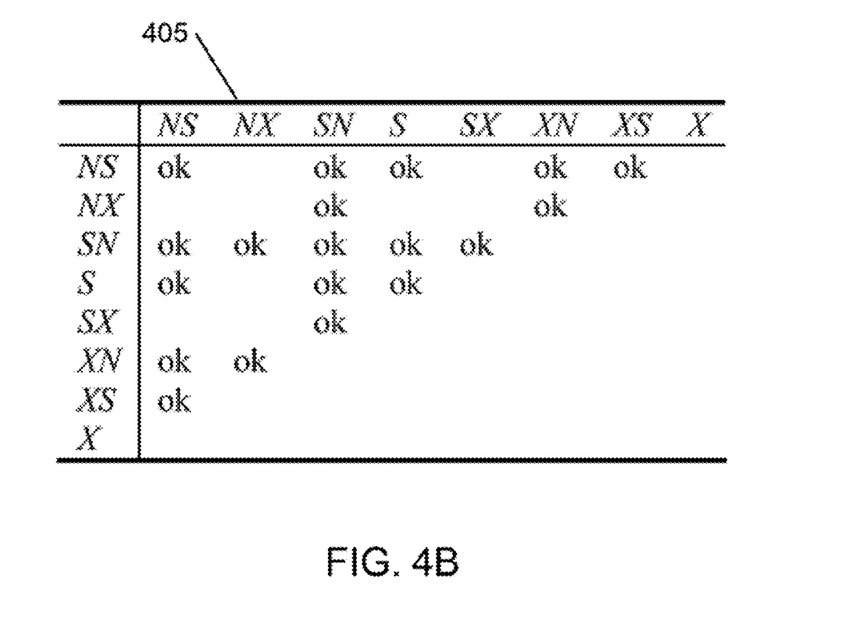
FIG. 4B illustrates an example table of compatibilities for key range locks.

As another example, consider key range locking in a B-tree index. FIG. 4B illustrates an example table of compatibilities for key range locks. Suppose a transaction T0 holds a XS lock ("key exclusive, gap shared") on a key value. If a transaction T1 acquires a violating NX lock ("key free, gap exclusive"), Table 405 shows that the XS and NX locks are not compatible. However, there is no commit dependency between T0 and T1 because T0 does not hold an update lock. If a transaction T2 then acquires a violating SN lock ("key shared, gap free"), a commit dependency is required. Controlled lock violation makes the correct decision easy: as the NX lock of transaction T1 conflicts only with the read-only part of the original XS lock of transaction T0, no commit dependency is required; but since the SN lock of transaction T2 conflicts with the update part of the original XS lock of transaction T0, T2 incurs a commit dependency on T0. Note that locks of modes SN and NX do not conflict as shown in Table 405; therefore, T2 does not incur a commit dependency on T1.

As a third example, consider a single key value in a B-tree index with transaction T0 holding an XN lock and transaction T1 holding an NS lock. These two locks are compatible, e.g., with T0 updating some non-key fields in the B-tree entry and T1 requiring phantom protection for a key value currently not in the index. After transactions T0 and T1 both reach their commit points, one after the other, transaction T2 acquires an SN lock violating the XN lock of transaction T0 and transaction T3 acquires a NX lock violating the NS lock of transaction T1. The locks of transactions T2 and T3 are compatible with each other.

It is appreciated that controlled lock violation permits the concurrency of these two committing transactions and two active transactions while making T2 wait only for T0 and T3 wait only for T1. Early lock release, in contrast, makes both transactions T2 and T3 wait for both transactions T0 and T1. That is, controlled lock violation achieves the same concurrency of early lock release while having the advantage of being simpler (e.g., with respect to data structures), more general (e.g., with respect to lock modes), and more accurate (e.g., with respect to key range locking).

Controlled lock violation can also be applied to distributed transactions in which a transaction coordinator manages a two-phase commit. The focus is on the initial or "pre-commit" phase of a two-phase commit. Controlled lock violation enforces locks only during transaction execution. In contrast, early lock release applies only to the final commit phase of a two-phase commit but not to the pre-commit phase and thus retains locks throughout the first phase of a two-phase commit. In other words, controlled lock violation allows a participant transaction to acquire its conflicting locks during the pre-commit phase. Early lock release, in contrast, reduces the lock retention time only by the time to write the final commit record to stable storage but not by the time for communication and coordination during two-phase commit. As described below, controlled lock violation enforces locks only during transaction execution, thereby considerably improving the performance of distributed transactions.

As an example, consider an update transaction T1 that is a local participant in a distributed transaction coordinated by a remote transaction T0, and another transaction T2 that requests a lock conflicting with a lock held by T1. With early lock release, T2 must wait until T1 has added its final commit record to the log buffer. With controlled lock violation, as soon as the local transaction T1 has received the request for the first commit phase, T2 may acquire a conflicting lock. Of course, T2 incurs a commit dependency on T1 and thus on T0. If either of those fail, T2 must roll back.

Figure 5:
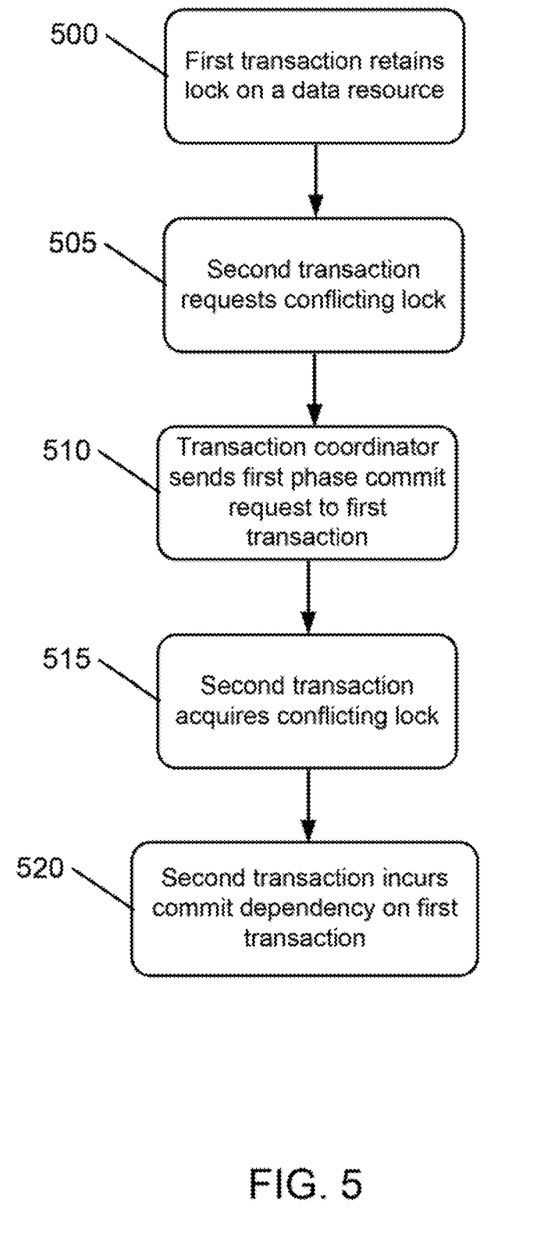
FIG. 5 is a flowchart for providing controlled lock violation for distributed data transactions.

Referring now to FIG. 5, a flowchart for providing controlled lock violation for distributed data transactions is described. Consider a first transaction T1 that is a local participant in a distributed transaction coordinated by a transaction coordinator T0. The first transaction T1 retains a lock on a data resource (500). Now consider a second, separate transaction T2 that requests a conflicting lock on the same data resource (505). With controlled lock violation, as soon as the transaction coordinator T0 sends the first commit request (i.e., first commit phase) to T1 (510), the second transaction T2 may acquire its conflicting lock (515). In doing so, the second transaction may incur a commit dependency on the first transaction and thus an indirect dependency on the transaction coordinator (520).

It is appreciated that this commit dependency is somewhat different (and more complex to implement) than the single non-distributed case illustrated in FIG. 3. In the preceding example, it is impossible to learn the appropriate final high water mark from T1 while it is still in its pre-commit state. In other words, another mechanism is required. If a commit dependency is created before a commit record has been appended to the log buffer and thus before the LSN of the final commit record is known, then the participating transactions must be linked such that either transaction attempting to commit considers the other. Note that there is a many-to-many relationship between such transactions: multiple later transactions might incur a commit dependency on the same earlier transaction, and a single later transaction might depend on the commit of multiple earlier transactions. Moreover, after a transaction incurs a commit dependency on an earlier transaction, either transaction might be the first to change states such that the commit dependency can be resolved and removed.

It is further appreciated that various data structures can represent a many-to-many relationship and enable the updates required when one of the transactions commits or aborts. For example, a list of pointers on both directions may be employed for instant processing of all state changes. A simpler design may use pointers only from the transaction holding a lock to the transaction acquiring a violating lock, plus a matching reference counter in the acquiring transaction. In the preceding example, when T2 acquires a lock that violates an update lock held by T1, transaction T2 adds to the state of T1 a pointer to T2 and increments a reference counter in its own transaction state. What happens next depends on who is ready to commit first.

Figure 6:
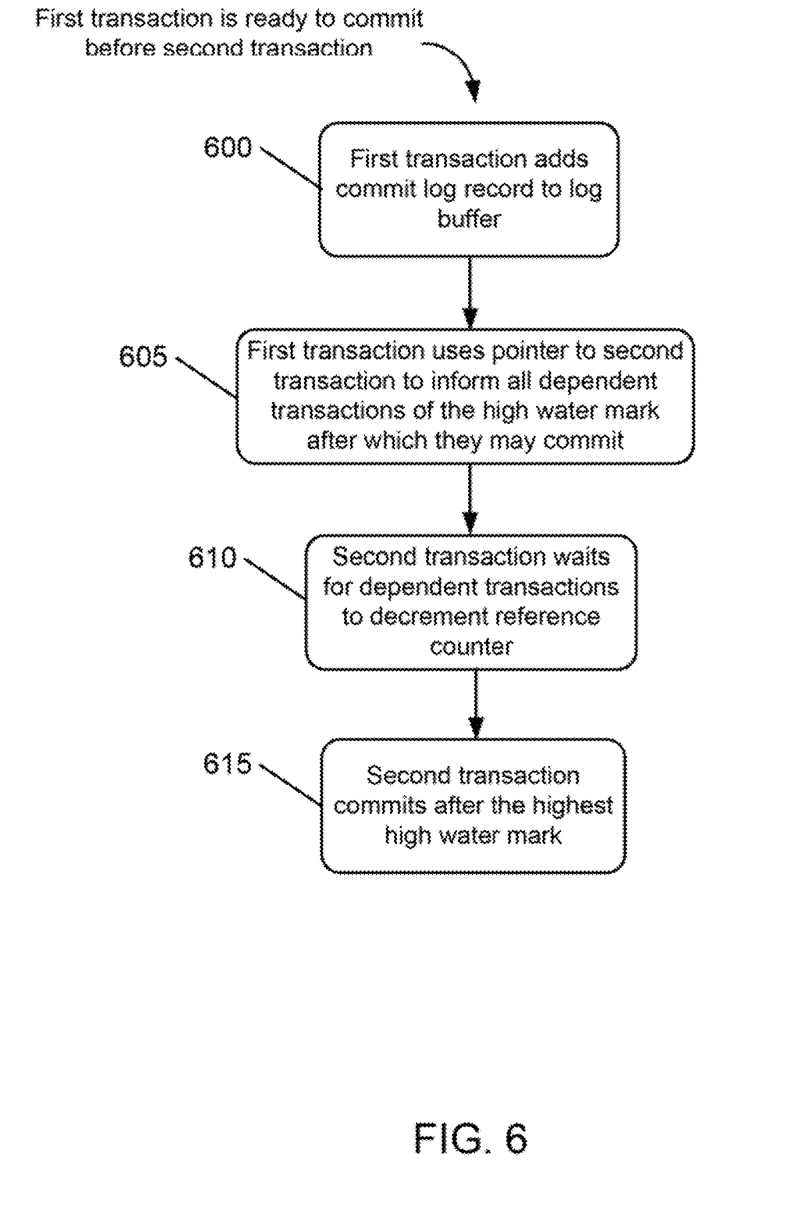
FIG. 6 is a flowchart for implementing a commit dependency in a two-phase commit of a distributed transaction when the first lock retaining transaction is ready to commit before the second transaction.

FIG. 6 illustrates a flowchart for implementing a commit dependency in a two-phase commit of a distributed transaction when the first lock retaining transaction is ready to commit before the second transaction. If transaction T1 is ready to commit before transaction T2, T1 first adds its commit record to the log buffer (600) and then uses its pointer to T2 (actually, its collection of pointers to all dependent transactions) to inform all dependent transactions of the high water mark after which they may commit (605). If transaction T2 has commit dependencies to multiple prior transactions, it must wait for all of them to decrement the reference counter (610). The highest high water mark of the prior transactions thus determines the earliest opportunity for T2 to commit (615).

Figure 7:
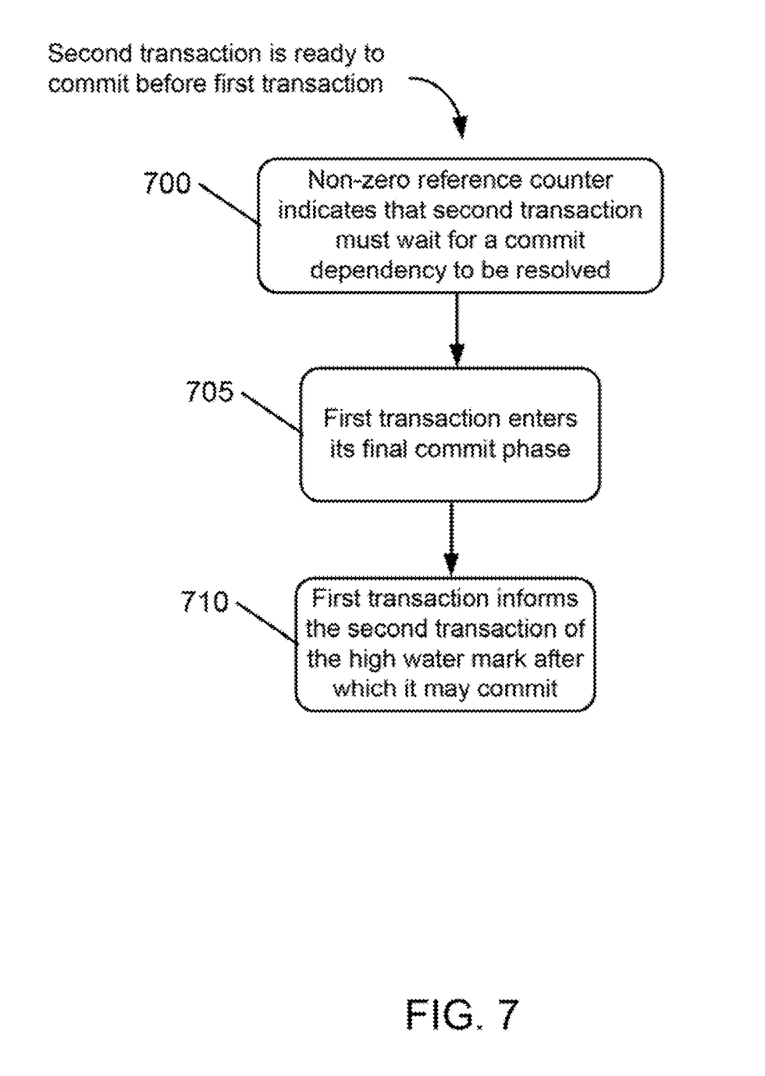
FIG. 7 is a flowchart for implementing a commit dependency in a two-phase commit of a distributed transaction when the second transaction is ready to commit before the first lock retaining transaction.

FIG. 7 illustrates a flowchart for implementing a commit dependency in a two-phase commit of a distributed transaction when the second transaction is ready to commit before the first lock retaining transaction. If transaction T2 is ready to commit before transaction T1, its non-zero reference counter indicates that T2 must wait for a commit dependency to be resolved (700). Eventually, when transaction T1 enters its final commit phase (705), it uses its pointer to T2 to inform the dependent transaction of the high water mark after which it may commit (710).

Note that if transaction T2 needs to abort, it may do so at any time. Since its transaction state does not include a pointer to transaction T1, the transaction state of T2 must not be deallocated until T1 also terminates. If transaction T1 needs to abort while a dependent transaction such as transaction T2 is still active, it uses its pointer to force its T2 to abort and roll back first. If there are multiple dependent transactions, they must abort in reverse order.

A concrete example may best illustrate the advantages of eliminating lock conflicts during both phases of a two-phase commit. Suppose a given transaction logic runs 0.01 ms (e.g., 40,000 instruction cycles on a core running at 4 GHz) and each commit phase runs 0.1 iris (to force a commit record to flash storage). Early lock release may improve the effective lock retention times by almost a factor of 2 (0.21 ms versus 0.11 ms), whereas controlled lock violation may improve the effective lock retention times by more than a factor of 20 (0.21 ms versus 0.01 ms). If locks can be violated immediately after a distributed transaction begins its commit sequence, lock contention during the two-phase commit sequence may cease to be a concern for performance and scalability.

In other words, the major concern about or argument against two-phase commit loses weight and credibility. By removing lock conflicts during communication and coordination of two-phase commit, controlled lock violation may substantially contribute to increased use of two-phase commit with distributed transactions and thus to the consistency and reliability of distributed systems.

In some cases, controlled lock violation may be advantageous even before the user (or application) requests a transaction commit for the transaction holding the lock. In general, such lock violation is a bad idea. For example, if transaction T0 needs and acquires a lock, transaction T1 violates this lock, and then T0 performs another action that requires the same lock again, then transaction T0 needs to violate the lock held by T1 and transactions T0 and T1 will have mutual, i.e., circular, commit dependencies on each other. This situation can be resolved only by aborting transaction T1. If, however, it is certain that transaction T0 will not require again a specific lock that it holds, then another transaction T1 may violate this lock. For example, a canned transaction (i.e., a standard set of queries and data updates) T0 may run a stored procedure, that stored procedure may consist of multiple statements, and each statement may touch its own set of tables, i.e., disjoint from the tables in other statements. All of these are not unreasonable assumptions. When they apply, then another transaction T1 may violate any lock from an earlier statement. The precise condition is that locks may be violated if neither the current nor any future statement might need them.

Suppose a very simple stored procedure for updating a balance of a bank account consists of the following statements:

```
Begin transaction
Update accounts set balance += . . .
Update accounts set balance -= . . .
Insert activities values ( . . . )
Commit transaction
```

This canned transaction moves money from one account to another and then inserts a record of it in a table of activities. After the first two statements, the table of accounts is not touched again, except perhaps to roll back the updates in case of a transaction failure, e.g., due to a deadlock. Thus, while the third statement is still executing, a later transaction may violate the locks on the accounts table still held by an active transaction. Even in this simple example, controlled lock violation during one of three statements reduces lock retention time for the accounts table by one third (not including lock retention after the commit request). In other words, in addition to eliminating lock contention while a commit record is written to stable storage, controlled lock violation can reduce lock contention even further.

Note that controlled lock violation of read-only locks does not incur a commit dependency. In other words, controlled lock violation of a read-only lock has no negative effect at all. Thus, for tables touched only by a single statement of a stored procedure, controlled lock violation gives the semantics and consistency of full serializability but with the concurrency control "footprint" and the lock conflicts of the "read committed" transaction isolation level. The tables involved in each statement can easily be extracted from the source code of the stored procedure. If disambiguation of table names requires a binding to the actual user invoking the stored procedure, such static analysis might not be possible, in particular if tables and views may have multiple names or aliases. Cases requiring user-specific name resolution are discouraged in practice, because these cases also prevent pre-compilation, cached query execution plans, and compile-time query optimization. The static analysis might focus on tables and materialized views (i.e., objects of the logical database design) or on indexes and partitions (i.e., objects of the physical database design). In the former case, it is sufficient to analyze the request syntax; in the latter case, query execution plans must also be considered. In summary, controlled lock violation can happen even before the commit request in some cases that may be expected to be common in practice, and it might for many applications combine the advantages of "read committed" and serializable transaction isolation levels.

Figure 8:
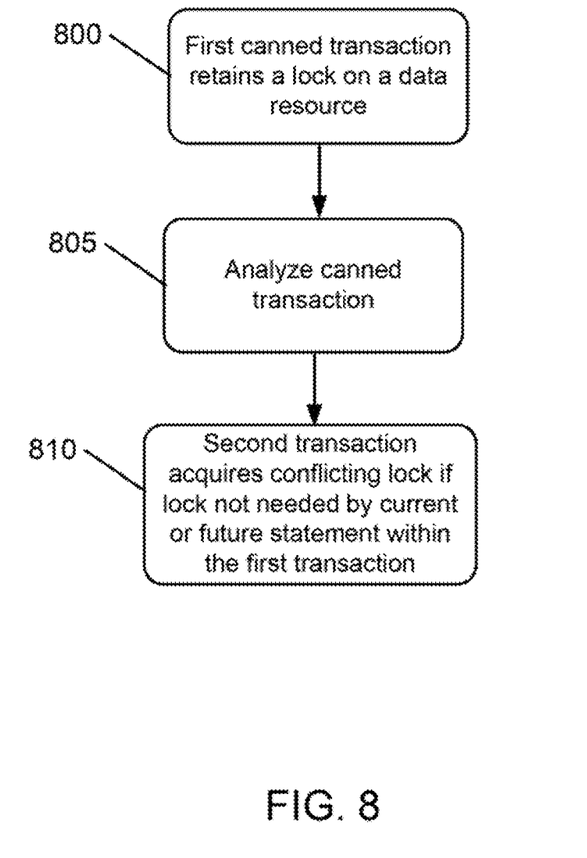
FIG. 8 is a flowchart for providing controlled lock violation for canned data transactions.

A flowchart for providing controlled lock violation for canned data transactions is shown in FIG. 8. A first canned transaction retains a lock on a data resource (800). The canned data transaction is analyzed to determine the nature of its statements (805). A second transaction may acquire a conflicting lock to the data resource if the analyzes determines that the lock is not needed on any current or future statements within the first transaction (810). As described above, this is the case illustrated by the third statement in the canned transaction for manipulating a bank account.

It is appreciated that controlled lock violation is a specific form of speculative execution. The speculation risk, however, is very small, as controlled lock violation requires that the earlier transaction reaches its commit point and formats a commit record in the log buffer before speculative execution begins. Nonetheless, with all other things equal, a system should schedule (process) a transaction without commit dependency ahead of one with, or one with fewer commit dependencies ahead of one with more. In other words, a transaction with commit dependencies should progress only if there is no work pending that is less speculative, or when the processing resources would remain idle except for speculative work. This is particularly true in the advanced forms of controlled lock violation discussed for distributed and canned transactions.

It is also appreciated that controlled lock violation is related to optimistic concurrency control, in the sense that new transactions may proceed by ignoring existing transactions and their concurrency "footprint." Controlled lock violation is, however, a form of pessimistic concurrency control, i.e., locking. It employs traditional locking techniques for synchronization atomicity or concurrency control—locks are released or violated only during the phase that ensures durability of transaction, i.e., flushing the commit record to stable storage.

This reliance on pessimistic concurrency control is very deliberate. In systems with many conflicts, avoiding wasted work by early detection of conflicts is the most important determinant of performance (other than a fine granularity of locking). Controlled lock violation wastes work (due to "cascading aborts" or "abort amplification") only if a transaction fails after reaching its commit point. In a single-site or single-log system, a transaction starts cascading aborts only if a system failure (crash) occurs in the time between adding a commit record to the log buffer and completing the write to stable storage, i.e., the time required for a single write operation. Moreover, in a traditional system that retains locks until a transaction is durable, the transactions failed due to cascading abort would not have started. In other words, controlled lock violation is pessimistic with respect to synchronization atomicity but it is optimistic with respect to durability once a transaction has started its commit activities. Risk and extent of wasted work are miniscule compared to the performance advantage of early lock release and controlled lock violation.

In a system with multiple logs and thus with two-phase commit, frequent failures during the first commit phase would suggest delaying controlled lock violation to the second phase. If, however, most transactions that start their commit activities also finish them successfully, the risk of cascading aborts is low. Similar considerations apply to controlled lock violation prior to the commit point of canned transactions—if failures are frequent, controlled lock violation should be restricted to the final commit phase.

Controlled lock violation avoids multi-version concurrency control and its complexities by delaying any conflicting transaction until the lock-holding transaction has finished its updates. Thus, there is no need for multiple versions of the same record. However, should a rollback be required, e.g., because a distributed transaction fails in the second phase of its two-phase commit, it is possible that multiple transactions need to roll back, which could take a single record back in time through multiple states. Nonetheless, at any one time, there is only a single version of each record in the database.

In summary, the basic form of controlled lock violation is superior to early lock release. Early lock release can boost transaction processing performance by a small factor or even an order of magnitude. In the cases in which early lock release applies, controlled lock violation enables the same amount of additional concurrency compared to traditional commit processing. There are multiple reasons to prefer controlled lock violation over early lock release. First, controlled lock violation is simpler and more robust because it has fewer special cases. It applies to all lock types—any lock may be violated and any but a read-only lock induces a commit dependency. Even after multiple rounds of correction and improvement, ELR still does not at all cover 'increment' locks, let alone other, more specialized locks that are used in real database systems, such as 'bulk insertion' or 'schema stability' or 'schema modify' locks in SQL Server, as well as the various special designs for key range locking and their lock modes. Controlled lock violation is a simple consistent solution for all of these lock types, easy enough for implementation; quality assurance, and maintenance by most software engineers working on data management code.

Second, controlled lock violation can be more precise. For key range locking, a precise separation of concurrency and conflict is required, in particular for hot spots known in many databases and their indexes. Controlled lock violation carries that precision to the commit dependency, whereas early lock release may introduce a commit dependency where none is required. Third, controlled lock violation works well with two-phase commit. With early lock release, a transaction might avoid lock conflicts if an earlier transaction is in the final phase of the two-phase commit. With controlled lock violation, a transaction can avoid lock conflicts during both phases, i.e., already during the initial phase. Thus, the effective lock retention (conflict) times are much shorter in two-phase commit with controlled lock violation than with early lock release. It could be argued that this reduction in lock conflicts takes most of the performance costs out of two-phase commit. For example, it might enable immediate (as opposed to eventually consistent) maintenance of all copies in a system relying on replicas for high reliability and high availability.

Lastly, controlled lock violation applies even before the user (or application) requests a commit. In a "canned" transaction with a fixed sequence of statements, locks can be violated prior to the commit request if neither the current nor any future statement might need them, and this can be based on static analysis of database objects and statements in a stored procedure.

Figure 9:
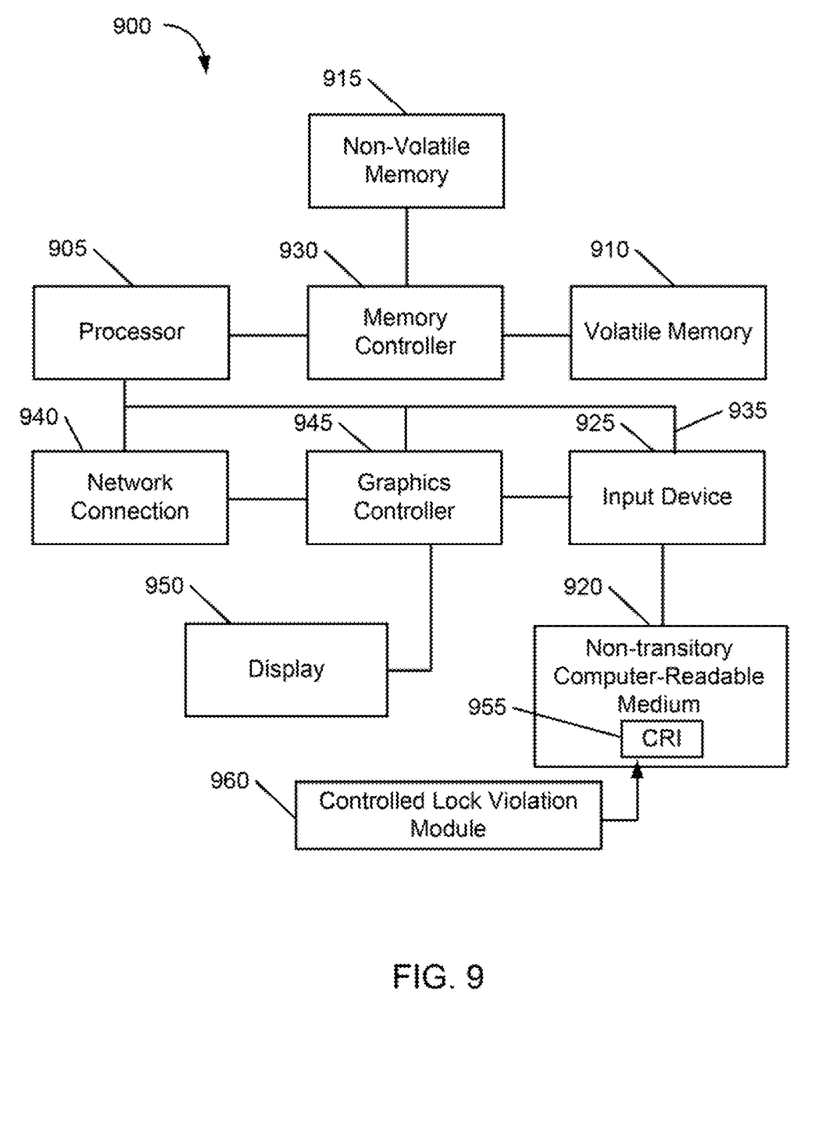
FIG. 9 is a block diagram of an example component for implementing the Controlled Lock Violation module of FIG. 1 according to various embodiments.

In some implementations, controlled lock violation can be implemented in hardware, software, or a combination of both. FIG. 9 illustrates a component for implementing the Controlled Lock Violation module of FIG. 1 according to the present disclosure. The component 900 can include a processor 905 and memory resources, such as, for example, the volatile memory 910 and/or the non-volatile memory 915, for executing instructions stored in a tangible non-transitory medium (e.g., volatile memory 910, non-volatile memory 915, and/or computer readable medium 920). The non-transitory computer-readable medium 920 can have computer-readable instructions 955 stored thereon that are executed by the processor 905 to implement a Controlled Lock Violation module 960 according to the present disclosure.

A machine (e.g., a computing device) can include and/or receive a tangible non-transitory computer-readable medium 920 storing a set of computer-readable instructions (e.g., software) via an input device 925. As used herein, the processor 905 can include one or a plurality of processors such as in a parallel processing system. The memory can include memory addressable by the processor 905 for execution of computer readable instructions. The computer readable medium 920 can include volatile and/or non-volatile memory such as a random access memory ("RAM"), magnetic memory such as a hard disk, floppy disk, and/or tape memory, a solid state drive ("SSD"), flash memory, phase change memory, and so on. In some embodiments, the non-volatile memory 915 can be a local or remote database including a plurality of physical non-volatile memory devices.

The processor 905 can control the overall operation of the component 900. The processor 905 can be connected to a memory controller 930, which can read and/or write data from and/or to volatile memory 910 (e.g., RAM). The processor 905 can be connected to a bus 935 to provide communication between the processor 905, the network connection 940, and other portions of the component 900. The non-volatile memory 915 can provide persistent data storage for the component 900. Further, the graphics controller 945 can connect to an optional display 950.

Each component 900 can include a computing device including control circuitry such as a processor, a state machine, ASIC, controller, and/or similar machine. As used herein, the indefinite articles "a" and/or "an" can indicate one or more than one of the named object. Thus, for example, "a processor" can include one or more than one processor, such as in a multi-core processor, cluster, or parallel processing arrangement.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein. For example, it is appreciated that the present disclosure is not limited to a particular configuration, such as component 900.

Those of skill in the art would further appreciate that the various illustrative modules and steps described in connection with the embodiments disclosed herein may be implemented as electronic hardware, computer software, or combinations of both. For example, the example steps of FIGS. 3, 5-8 may be implemented using software modules, hardware modules or components, or a combination of software and hardware modules or components. Thus, in one embodiment, one or more of the example steps of FIGS. 3, 5-8 may comprise hardware modules or components. In another embodiment, one or more of the steps of FIGS. 3, 5-8 may comprise software code stored on a computer readable storage medium, which is executable by a processor.

To clearly illustrate this interchangeability of hardware and software, various illustrative components, blocks, modules, and steps have been described above generally in terms of their functionality (e.g., the Controlled Lock Violation module 960). Whether such functionality is implemented as hardware or software depends upon the particular application and design constraints imposed on the overall system. Those skilled in the art may implement the described functionality in varying ways for each particular application, but such implementation decisions should not be interpreted as causing a departure from the scope of the present disclosure.

What is claimed is:

1. A system for providing controlled lock violation for data transactions, comprising:
    a processor for executing a first data transaction and a second data transaction, the first and second data transactions operating on a plurality of data resources, wherein the first data transaction comprises a fixed sequence of statements; and
    a controlled lock violation module to grant to the second transaction a conflicting lock to a data resource locked by the first transaction with a lock, the conflicting lock granted to the second transaction while the first transaction holds its lock
    wherein the controlled lock violation module grants to a third transaction a third lock upon a second data resource, the third lock violating a lock held by the second transaction upon the second data resource, and wherein a commit dependency is established between the third and the second transactions.

2. The system of claim 1, wherein the controlled lock violation module determines that the first transaction lock can be violated when the first transaction has allocated a commit log record in a log buffer.

3. The system of claim 2, wherein the first transaction retains its lock to the data resource until it commits and the commit log record has been written to stable storage.

4. The system of claim 1, wherein the controlled lock violation module establishes a commit dependency between the second transaction and the first transaction when the lock held by the first transaction is an update lock.

5. The system of claim 4, wherein a log sequence number associated with the commit log record of the first transaction is registered as a high water mark for the second transaction's commit dependency when the second transaction is granted the conflicting lock.

6. The system of claim 5, wherein an update lock comprises a lock from the group consisting of: an exclusive lock; an intent exclusive lock; an increment lock; and an intent increment lock.

7. The system of claim 4, wherein the commit dependency between the second transaction and the first transaction is resolved when the commit log record has been written to stable storage.

8. A method for providing controlled lock violation for data transactions, comprising:
    executing, by a computer, a first data transaction and a second data transaction, the first and second data transactions operating on a plurality of data resources and wherein the first transaction is a sub-transaction of a distributed transaction managed with distributed two-phase commit processing, wherein the first data transaction comprises a fixed sequence of statements;
    granting to the second transaction, by a computer, a conflicting lock to a data resource locked by the first transaction with a lock, the conflicting lock granted to the second transaction while the first transaction holds its lock;
    adding, by the first transaction, a commit log record to a log buffer when the first transaction is read to enter a final commit phase;
    informing, by the first transaction, using a pointer to the second transaction, dependent transactions of a high water mark after which dependent transactions can commit;
    delaying the second transaction decrementing a reference counter until dependent transactions complete; and
    committing the second transaction after a highest high water mark of its dependent transactions.

9. The method of claim 8, further comprising determining that the conflicting lock that violates the first transaction's lock can be granted to the second transaction once a transaction coordinator for the distributed transaction has sent a first commit phase commit request to the first transaction.

10. The method of claim 8, further comprising establishing a commit dependency for the second transaction on the first transaction.

11. The method of claim 10, wherein establishing a commit dependency comprises adding a pointer to the second transaction to a state of the first transaction.

12. The method of claim 11, further comprising incrementing a reference counter associated with the second transaction.

13. The method of claim 11, wherein if the second transaction is ready to enter a final commit phase before the first transaction, having the second transaction wait for the commit dependency on the first transaction to be resolved.

14. The method of claim 13, comprising having the first transaction use the pointer to the second transaction to inform the second transaction that the first transaction has entered its final commit phase and to inform the second transaction of a high water mark associated with the first transaction.

15. The method of claim 14, comprising having the second transaction commit after the high water mark associated with the first transaction.

16. A non-transitory computer readable medium having instructions stored thereon executable by a processor to:
    retain, by a first transaction, a lock on a data resource, wherein the first transaction comprises a fixed sequence of statements;
    analyze the first transaction; and
    grant to a second transaction a conflicting lock to the data resource if the analysis of the first transaction determines that the lock held by the first transaction on the data resource is not needed by a current statement and a future statement, the conflicting lock granted to the second transaction while the first transaction holds its lock, wherein the instructions to analyze the first transaction comprise instructions to perform a static analysis of database objects associated with the first transaction.

* * * * *